United States Patent [19]

Hughes et al.

[11] Patent Number: 5,731,921

[45] Date of Patent: Mar. 24, 1998

[54] METHOD AND APPARATUS FOR DETERMINING AND USING HEAD PARAMETERS IN A HELLICAL SCAN RECORDER

[75] Inventors: Timothy C. Hughes, Boulder; Fadi Y. Abou-Jaoude, Westminster, both of Colo.

[73] Assignee: Exabyte Corporation, Boulder, Colo.

[21] Appl. No.: 561,155

[22] Filed: Nov. 21, 1995

Related U.S. Application Data

[63] Continuation of Ser. No. 150,733, Nov. 12, 1993, abandoned.

[51] Int. Cl.$^6$ .................................................... G11B 5/02
[52] U.S. Cl. .................................. 360/27; 360/51; 360/75
[58] Field of Search ........................... 360/25, 31, 77.13, 360/27, 75; 324/202

[56] References Cited

U.S. PATENT DOCUMENTS

| | | | |
|---|---|---|---|
| 3,657,707 | 4/1972 | McFarland et al. | 346/109 |
| 4,125,881 | 11/1978 | Eige et al. | 360/50 |
| 4,422,112 | 12/1983 | Tanaka | 360/75 |
| 4,835,628 | 5/1989 | Hinz et al. | 360/44 |
| 4,843,495 | 6/1989 | Georgis et al. | 360/73.08 |
| 5,065,261 | 11/1991 | Hughes et al. | 360/70 |
| 5,068,757 | 11/1991 | Hughes et al. | 360/77.13 |
| 5,103,354 | 4/1992 | Singhoff et al. | 360/75 |
| 5,142,422 | 8/1992 | Zook et al. | 360/54 |
| 5,191,491 | 3/1993 | Zweighaft | 360/77.13 |
| 5,233,988 | 8/1993 | Yanagihara | 360/77.14 |
| 5,243,473 | 9/1993 | Lee | 360/77.13 |
| 5,291,564 | 3/1994 | Saito | 360/75 |
| 5,354,504 | 10/1994 | Ohmi et al. | 360/137 |

*Primary Examiner*—Andrew L. Sniezek
*Assistant Examiner*—Larry T. Cullen
*Attorney, Agent, or Firm*—Nixon & Vanderhye, P.C.

[57] ABSTRACT

Methods of calibrating a helical scan recorder include transporting a storage media past a drum at a controlled linear velocity and recording tracks on the media using a write head. During a read-after-write operation, servo signals recorded on the track are read. The servo signals from the tracks are used to determine an axial offset variance of the write head and a read head on the drum. In one mode, calibration is achieved for a first helical scan recorder which does not have a capstan, by installing a drum of the recorder in a second helical scan recorder, using the second recorder to record servo signals on two tracks, reading the servo signals from those two tracks, second recorder, using the servo signals to determine axial offset variance, and storing a value indicative of axial offset variance in a memory of the first recorder. The axial offset variance is used in a write splice operation and, in one mode, to determine linear velocity of the media.

8 Claims, 12 Drawing Sheets

METHOD AND APPARATUS FOR DETERMINING AND USING HEAD PARAMETERS IN A HELLICAL SCAN RECORDER

This is a continuation of application Ser. No. 08/150,733 filed Nov. 12, 1993, now abandoned.

BACKGROUND

1. Field of Invention

This invention pertains to the operation of a helical scan recorder, and particularly for determining parameters of the helical scan recorder for enhancing performance thereof.

2. Related Art and Other Considerations

Numerous prior art patents and publications teach recording and reading of information stored in helical stripes (or "tracks") on magnetic storage media (e.g., magnetic tape). In a helical scan arrangement, travelling magnetic tape is at least partially wrapped around a rotating drum (or scanner) so that heads (both write head(s) and read head(s)) positioned on the drum are contiguous to the drum as the drum is rotated.

One or more write heads on the drum physically record data on the tape in a series of discrete tracks oriented at an angle with respect to the direction of tape travel. As used herein, track or stripe "pitch" means a distance between centerlines of two adjacent tracks, the centerlines of the tracks extending along the direction of head travel and the distances therebetween being taken perpendicularly to the centerlines. In a dual azimuth system, track pitch equates to the width of a track. The data on the track is formatted, prior to recording on the tape, to provide sufficient referencing information to enable later recovery during readout by one or more read heads.

Examples of helical scan recorders are shown, inter alia, in the following U.S. patents (all of which are incorporated herein by reference):

U.S. Pat. No. 4,835,628 to Hinz et al.
U.S. Pat. No. 4,843,495 to Georgis et al.
U.S. Pat. No. 5,065,261 to Hughes et al.
U.S. Pat. No. 5,068,757 to Hughes et al.
U.S. Pat. No. 5,142,422 to Zook et al.

On a drum of a helical scan recorder, the write head(s) are distanced from the read head(s) both by a radial distance and an axial distance (the axial distance being taken along the major axis of the drum). The separation of the write head and read head along the major axis of the drum is herein denoted as the "axial offset" or "axial offset distance". Although a helical scan recorder is intended to be manufactured to have a specification axial offset distance, it generally turns out that the drum of a helical scan recorder as manufactured has an actual axial offset distance which varies from the specification axial offset distance. As used herein, "axial offset variance" means the differential between (1) a desired (e.g., specification or reference) axial offset distance by which a write head is supposed to be separated from a read head on the drum along the drum axis, and (2) an actual axial offset distance by which a write head is actually separated from a read head on the drum along the drum axis.

To the extent that axial offset variance has been measured in the prior art, such measurements have taken the form of imprecise gauging with the use of optical measurement devices such as a high power microscope. However, the margin of error of such measurement devices is greater than the precision required for use in a helical scan recorder.

Axial offset variance has importance for a number of reasons. For example, axial offset variance is a factor which complicates write splice operations. In a write splice, the recorder must start recording exactly at a point ("splice location") at which the previous recording had stopped. To maximize media usage, the junction of new data to old data must be seamless, so that track pitches are continuous.

If there is no axial offset variance (e.g., axial offset variance=0), track pitch uniformity can easily be obtained at the write splice location. However, even a small axial offset variance (for example, two microns) will result in nonuniformity of track pitch at the write splice location. Subsequent read operations in the neighborhood of the write splice location can cause servoing problems, particularly if several splices are close together.

Axial offset variance also can be a factor in determining linear tape speed in certain helical scan recorders, such as a capstanless helical scan recorder. In this regard, see simultaneously-filed U.S. patent application Ser. No. 08/150,726 of Georgis and Zweighaft entitled "Method And Apparatus For Controlling Linear Tape Speed In A Helical Scan Recorder" (incorporated herein by reference).

SUMMARY

Methods of calibrating a helical scan recorder include transporting the media past a drum at a controlled linear velocity and recording tracks on the media using a write head during a first angular portion of a drum revolution. During a second angular portion of a drum revolution, servo signals are read. The servo signals are used to determine an axial offset variance for the write head and the read head on the drum.

As used herein, "axial offset variance" means a differential between (1) a desired (e.g., specification or reference) axial offset distance by which a write head is supposed to be separated from a read head on the drum along the drum axis, and (2) an actual axial offset distance by which a write head is actually separated from a read head on the drum along the drum axis.

In one mode of the invention wherein the helical scan recorder has a fixed-radius, motor-driven capstan and the tracks are read back within 180 degrees of recordation, the servo signals obtained during the media write operation are used to obtain a first interim value q(B−K3), in which B is a head overlap on a second of two servo-bearing tracks, q is an output voltage per micrometer of track overlap, and K3 is the axial offset variance. The storage media is then rewound, and the media transported past the drum at the controlled linear velocity while a media read operation is conducted. In the media read operation, tracks recorded on the tape are read and servo signals recorded thereon are used to obtain further interim values A, B (A being the head overlap on a first of the servo-bearing tracks). The first interim value and the second interim value are then used to determine a value indicative of the axial offset variance.

Another mode of the invention concerns a helical scan recorder which does not have a capstan, and wherein the tracks are read back at least 540 degrees after recordation. In this mode, the drum of the capstanless recorder is installed in a test device such as another helical scan recorder in which media can be transported past the drum at a controlled linear velocity. Tracks are recorded on the media at the controlled linear velocity using the write head. Servo signals recorded on two tracks are read back at least 540 degrees later. The servo signals from the two tracks are used to determine a value indicative of an axial offset variance of the write head and the read head on the drum. The drum is then removed from the controlled velocity recorder and installed in the capstanless recorder. A value indicative of the axial offset variance is stored in a memory of the capstanless helical scan recorder. The stored value indicative of the axial offset variance can then be used to control linear velocity of the storage media in the capstanless recorder and to attain uniform track pitch during a write splice operation.

In yet another mode of the invention, a fixed length calibration tape having length corresponding to a predetermined number of tracks (e.g., of predetermined calibration information) is installed in the recorder. Then, the recorder records information (e.g., the predetermined calibration information) on the installed fixed length calibration tape. A number of tracks actually recorded is then determined, and compared with the predetermined number of tracks which perfectly fit on the calibration tape. The comparison is then used to obtain a parameter related to axial offset variance.

A write splice operation according to the invention involves reading tracks previously recorded on a storage media and using a stored value indicative of the axial offset variance in order to control positioning of the write head. Write head positioning is controlled so that a track subsequently recorded at the write splice location will have uniform track pitch with tracks previously recorded upstream from the write splice location. A track of uniform pitch is then recorded at the write splice location.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4C is a schematic view heads traversing helical stripes having a guardband in the helical scan recording system of FIG. 1B.

DETAILED DESCRIPTION OF THE DRAWINGS

Figure 1B:
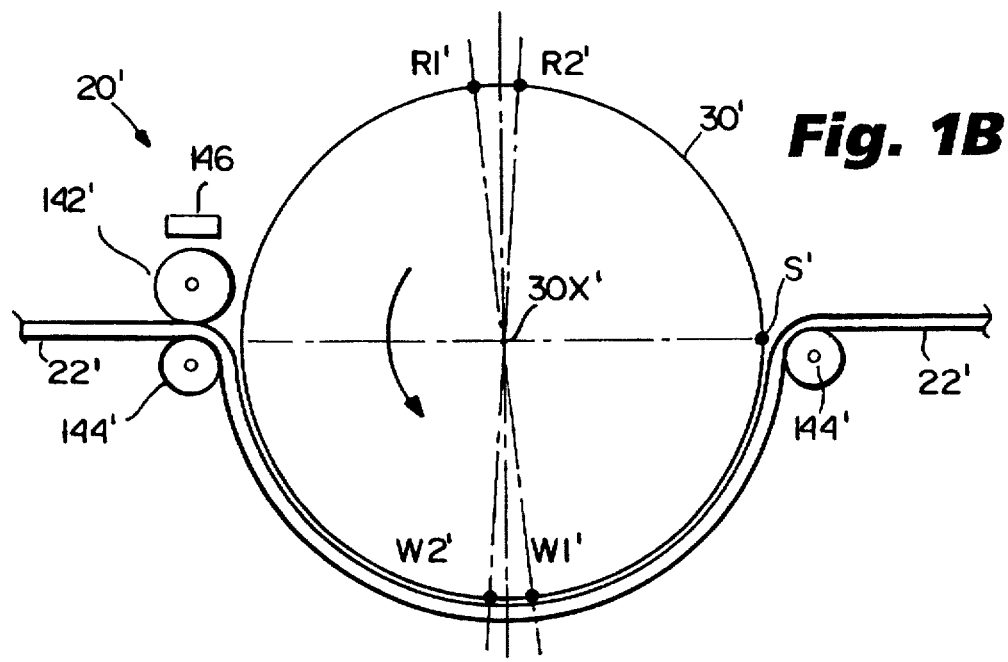
FIG. 1B is a schematic view of portions of a helical scan recording system having a capstan according to an embodiment of the invention.
Figure 1A:
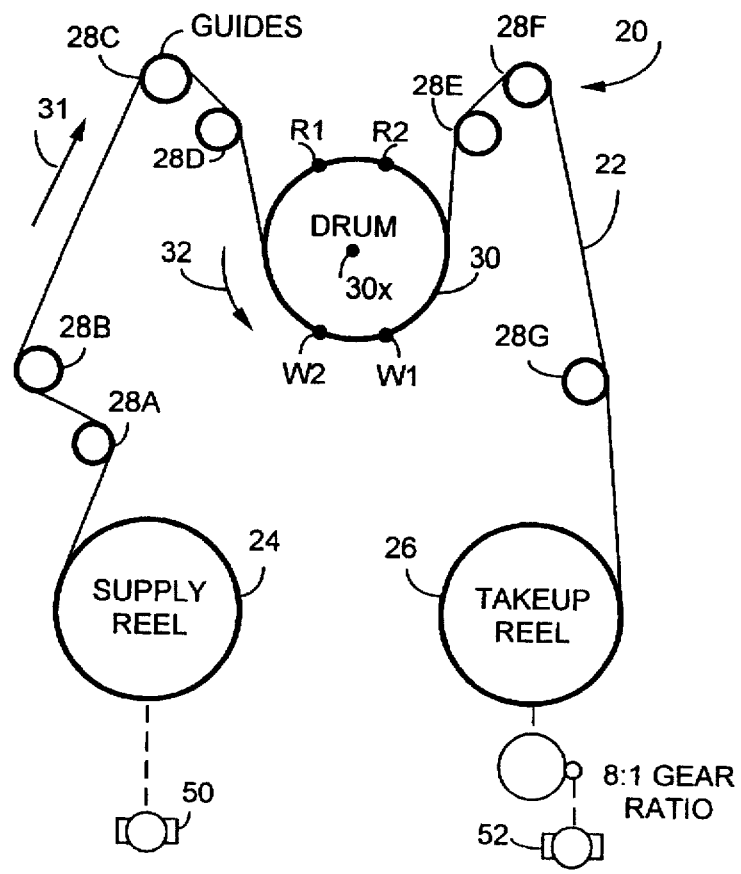
FIG. 1A is a schematic view of portions of a capstanless helical scan recording system according to an embodiment of the invention.

FIG. 1A shows portions of a capstanless tape path for a helical scan recording system generally depicted by reference numeral 20. In particular, FIG. 1A shows a magnetic tape 22 (such as an 8 mm magnetic tape, for example) having a first end wound around a supply reel 24 and a second end wound around a take-up reel 26. The path traversed by tape 22 is defined at least in part by a series of tape guides 28A–28G and a rotating scanner or drum 30. Drum 30 has a drum major axis 30X. In all operations excepting a rewind operation, tape 22 travels from supply reel 24 to take-up reel 26 in the direction depicted by arrow 31.

Simultaneously-filed U.S. patent application Ser. No. 08/150,730 of Robert J. Miles and James Zweighaft entitled "Capstanless Helical Drive System" (incorporated herein by reference) provides a detailed understanding of the particular capstanless tape path partially depicted in FIG. 1A.

Figure 4A:
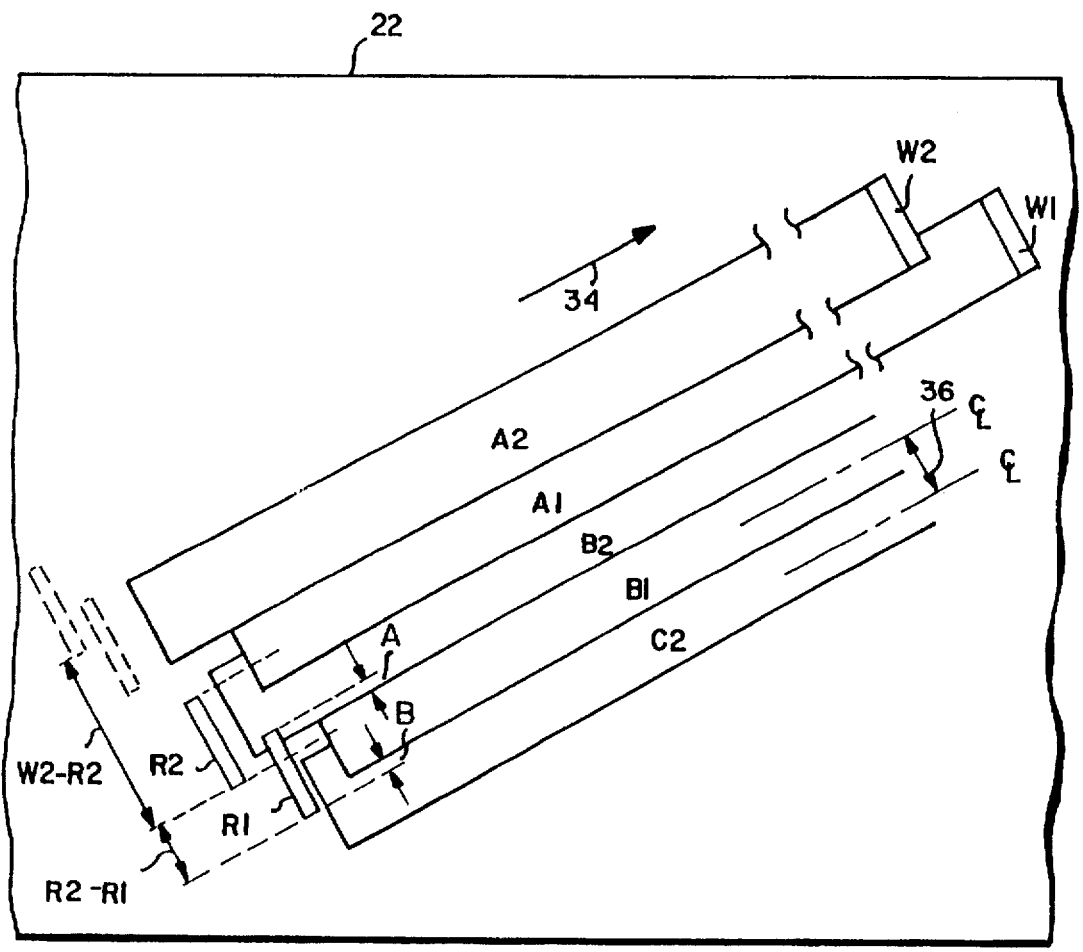
FIG. 4A is a schematic view of heads traversing dual azimuth helical stripes in the helical scan recording system of FIG. 1A.

As shown both in FIG. 1A and FIG. 2A, drum 30 has read heads R1 and R2 as well as write heads W1 and W2 mounted on the circumference thereof (the exact positioning of which will be described below). Drum 30 rotates in the direction depicted by arrow 32. As drum 30 rotates, at any moment a portion of its circumference is in contact with travelling tape. During a recording or write operation, write heads W1 and W2 are periodically positioned to record "stripes" or "tracks" (such as tracks C2, B1, B2, A1, and A2 shown in FIG. 4A) as heads W1 and W2 move in a direction of head travel (depicted by arrow 34 in FIG. 4A) across tape 22. FIG. 4 also depicts track pitch (depicted by arrow 36 in FIG. 4) which (in the illustrated dual azimuth system) is also essentially the width of the track (after recordation of neighboring tracks) in a direction perpendicular to the track centerline (the track centerline optimally being parallel to direction 34).

FIG. 4A also illustrates overlap of read head R1 onto adjacent tracks. In particular, read head R1 has an overlap "A" onto adjacent track B2 (for reading off-azimuth servo signals recorded on track B2) on an overlap "B" onto adjacent track C2 (for reading off-azimuth servo signals recorded on track C2).

Helical scan system 20 uses a read-after-write procedure as disclosed in simultaneously-filed U.S. patent application Ser. No. 08/150,726 of Georgis and Zweighaft entitled "Method And Apparatus For Controlling Media Linear Speed In A Helical Scan Recorder" (incorporated herein by reference).

Figure 2B:
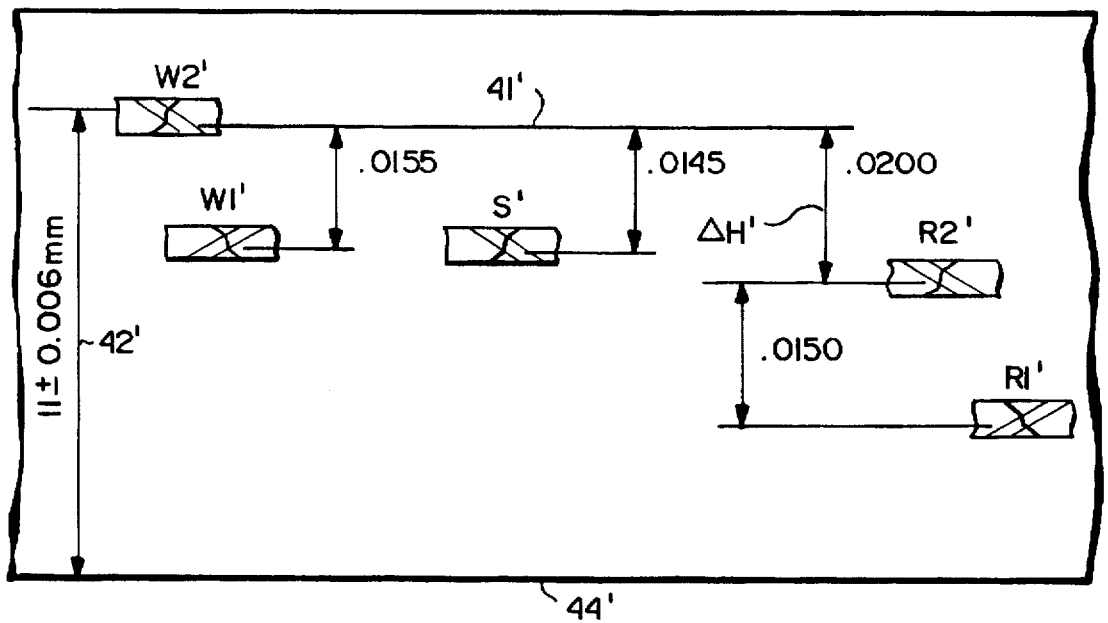
FIG. 2B is a schematic view of a circumferential surface of a drum utilized in the helical scan recording system of FIG. 1B, the drum appearing as if its circumferential surface were cut and unrolled in planar fashion.
Figure 2A:
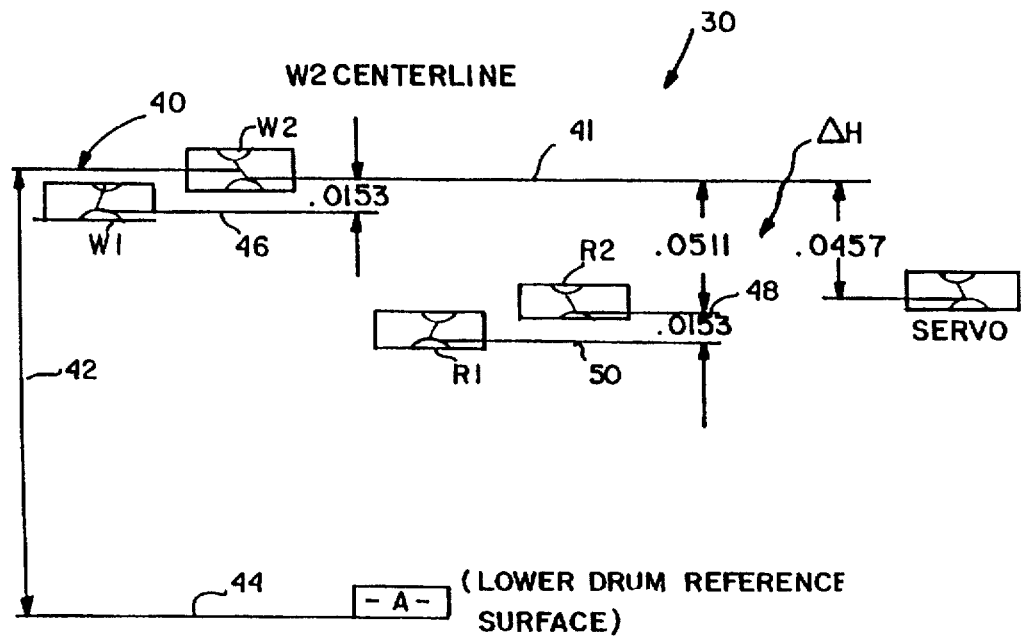
FIG. 2A is a schematic view of a circumferential surface of a drum utilized in the helical scan recording system of FIG. 1A, the drum appearing as if its circumferential surface were cut and unrolled in planar fashion.

FIG. 2A is a schematic depiction of specification-prescribed vertical (e.g., axial) positionings of heads W1, W2, R1 and R2 on drum 30 of the embodiment of FIG. 1A. FIG. 2A shows drum 30 as if its circumferential surface were cut and rolled out in planar fashion. In FIG. 2A, a centerline 40 of head W2 is shown per specification to be located a distance 42 above a drum reference surface 44 (e.g., the lower axial surface of drum 30). FIG. 2A further shows that a lower edge line 46 of head W1 per specification is located a distance 0.0153 microns below lower edge line 41 of head W2; that a lower edge line 48 of head R2 per specification is located a distance 0.0511 microns below lower edge line 41; and, that a lower edge line 50 of head R1 per specification is located a distance 0.0153 microns below lower edge line 48. The distance separating the lower edge lines 41 and 48 along the axis of the drum, known as the "head 2 offset" or "axial offset distance", is depicted by the distance $\Delta H$.

Placement of heads W1, W2, R1 and R2 on drum 30 results in the formation of tracks as shown in FIG. 4A. In particular, as tape 22 travels past rotating drum 30, heads W1, W2, R1 and R2 travel in the direction shown by arrow In view of the axial offsets of the heads as described with reference to FIG. 2A, FIG. 4A shows that as write heads W1 and W2 finish recording their respective tracks A1 and A2 during a first half of a drum revolution, read heads R1 and R2 are almost ready to begin (during the second half of the same drum revolution) read-back of tracks B1 and B2, respectively. Tracks B1 and B2 about-to-be-read by heads R1 and R2 respectively in FIG. 4A were written during the revolution of drum 30 which preceded the revolution during which tracks A1 and A2 were recorded. Hence, for any track, its read-after-write reading by heads R1 and R2 occurs 540 degrees of revolution of drum 30 after the track is recorded. By now it should be apparent that FIG. 4A illustrates tracks having the numerical suffix "1" as being written by head W1 and subsequently read back by head R1. Similarly, tracks having the numerical suffix "2" are written by head W2 and subsequently read back by head R2.

Although not illustrated herein, it should be understood that servo zones are recorded on at least selected tracks. In the illustrated embodiment, servo zones are recorded on tracks written by write head W2. A more detailed understanding of the servo zones utilized by the helical scan system 20 of FIG. 1A can be gleaned from simultaneously-filed U.S. patent application Ser. No. 08/150,726 of Georgis and Zweighaft entitled "Method And Apparatus For Controlling Media Linear Speed In A Helical Scan Recorder" (incorporated herein by reference).

Figure 3A:
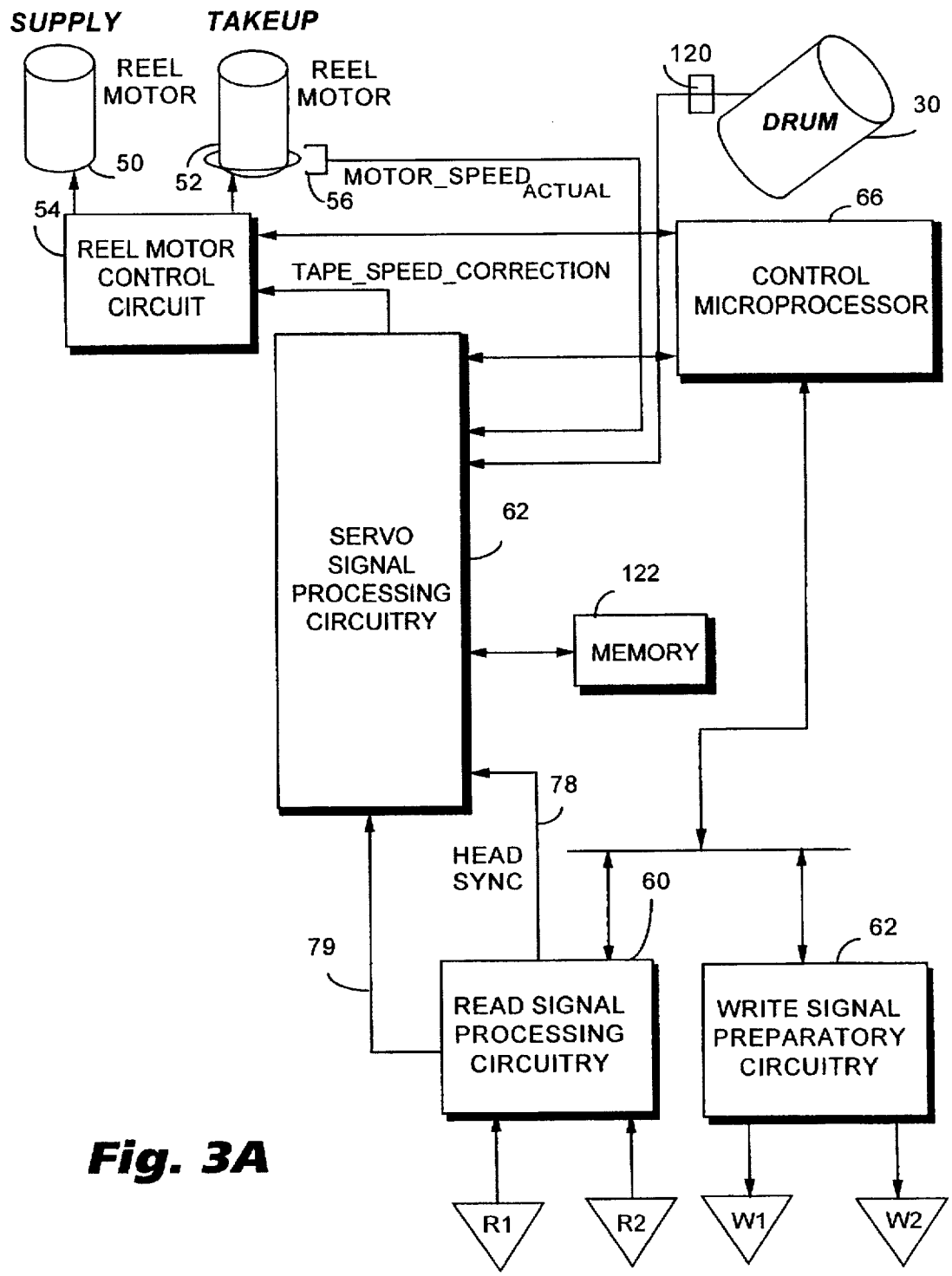
FIG. 3A is a schematic view of a portion of electronics included in the helical scan recording system of FIG. 1A.

FIG. 3A shows electronics of the tape drive system 20 of the embodiment of FIG. 1A, including reel motor 50 for rotating supply reel 24 and reel motor 52 for rotating take-up reel 26 and a reel motor control circuit 54. In addition, FIG. 3A shows read signal processing circuitry 60 involved in processing signals obtained from read heads R1 and R2; write signal preparatory circuitry 62; and servo signal processing circuitry 64; all under direction of control microprocessor 66.

Details of the read signal processing circuitry 60, write signal preparatory circuitry 62, and servo signal processing circuitry 64 are more fully discussed in simultaneously-filed U.S. patent application Ser. No. 08/150,726 of Georgis and Zweighaft entitled "Method And Apparatus For Controlling Media Linear Speed In A Helical Scan Recorder" (incorporated herein by reference).

As further shown in FIG. 3A, servo signal processing circuitry 64 is connected to receive the signal motor_speed$_{actual}$ from take-up reel motor tachometer 56. Further, servo signal processing circuitry 64 receives a signal drum_speed from a tachometer 120 which is used to monitor revolutions of drum 30. In addition, servo signal processing circuitry 64 has access to non-volatile memory 122 in which are stored various values and constants, including a constant K3 (axial offset variance) here of interest. Also, alternatively, drum_speed can be presumed to be a constant and stored in memory 122.

An output terminal of servo signal processing circuitry 64 applies a signal tape_speed_correction to reel motor control circuit 54. Examples of structural details of reel motor control circuit 54 are provided in simultaneously-filed U.S. patent application Ser. No. 08/150,727 of James Zweighaft entitled "Power-Off Motor Deceleration Control System" as well as in simultaneously-filed U.S. patent application Ser. No. 08/150,731 of James Zweighaft et al. entitled "High Performance Power Amplifier", both of which are incorporated herein by reference.

Figure 3B:
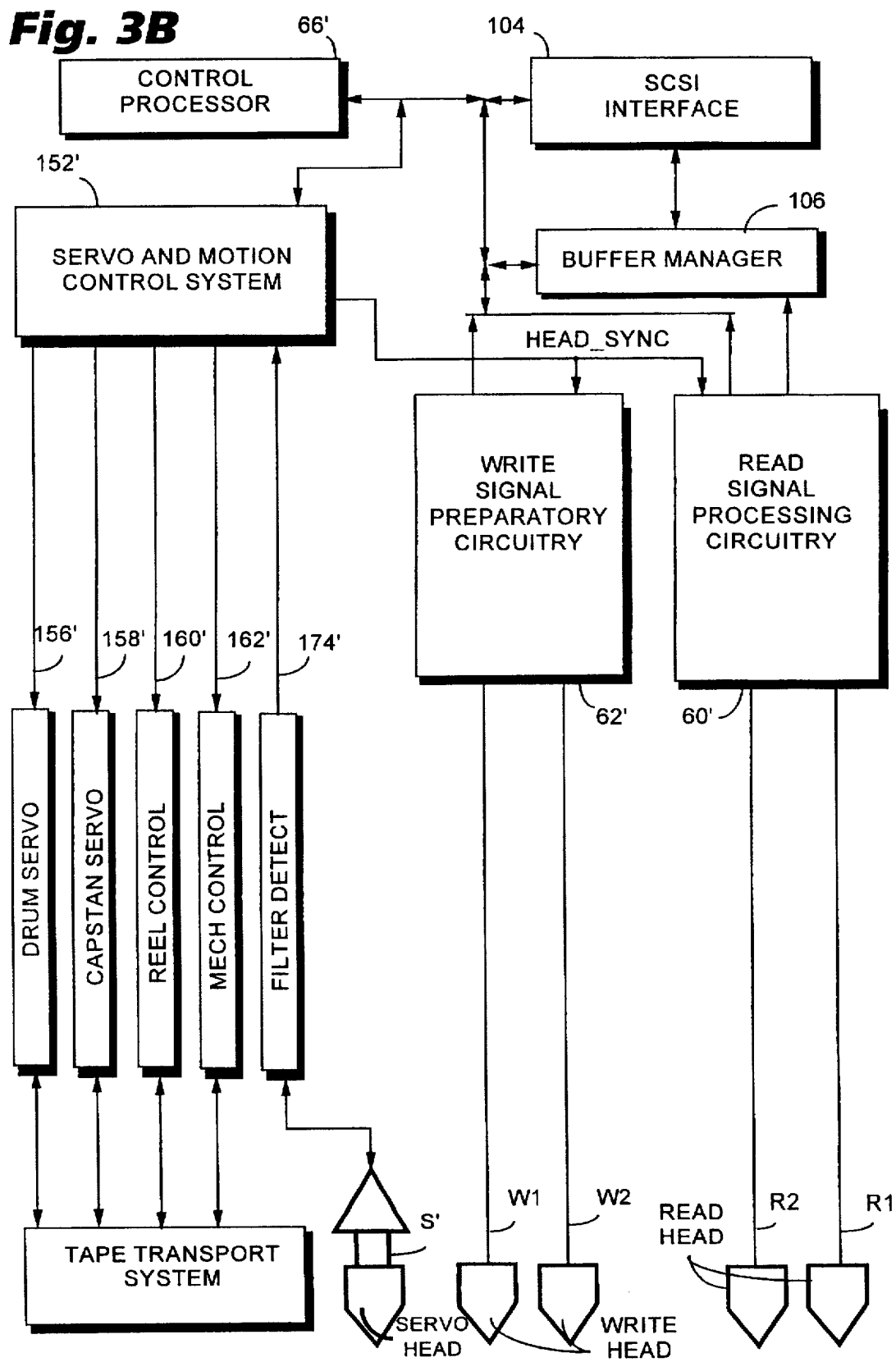
FIG. 3B is a schematic view of a portion of electronics included in the helical scan recording system of FIG. 1B.

FIG. 1B shows portions of a capstan-utilizing tape path for a helical scan recording system generally depicted by reference numeral 20'. In discussing the embodiment of FIG. 1B and its related drawings FIG. 2B and FIG. 3B, structural members having functions analogous to those of the embodiment of FIG. 1A bear analogous (but primed) reference numerals. In addition to other differences specifically discussed herein, system 20' of FIG. 1B includes a capstan 142' as well as tape guides 144'. Capstan 142' has an associated capstan tachometer 146'. Capstan 142' imparts a precise linear velocity to tape 22', which linear velocity is known with reference to output from capstan tachometer 146' Further, unlike system 20, system 20' uses its servo head S' to read servo zones recorded on tracks written by head W2.

FIG. 2B, in like manner as FIG. 2A, is a schematic depiction specification-prescribed vertical positioning of heads W1', W2', R1' and R2' on drum 30' including the "axial offset distance" $\Delta H'$. As explained in simultaneously-filed U.S. patent application Ser. No. 08/150,726 of Georgis and Zweighaft entitled "Method And Apparatus For Controlling Media Linear Speed In A Helical Scan Recorder" (incorporated herein by reference), the axial spacings of heads in the embodiment of FIG. 1A differs from the axial spacings of heads in the embodiment of FIG. 1B, with the result that for any track, a read-after-write procedure occurs during subsequent revolutions of drum 30 after the track is written (e.g., intervening tracks are recorded before a track is read for checking).

Similar to the embodiment of FIG. 1A, the embodiment of FIG. 1B has electronics which includes write signal preparatory circuitry 62' and read signal processing circuitry 60', as well as a control microprocessor 66'. In addition, electronics of the embodiment of FIG. 1B includes a SCSI interface 104'; a buffer manager 106'; and servo motion and control system 152'. Servo motion and control system 152' controls the following sub-systems: drum servo 156'; capstan servo 158'; reel control 160'; mechanical control 162'; and, servo filter detector 174'.

Figure 9:
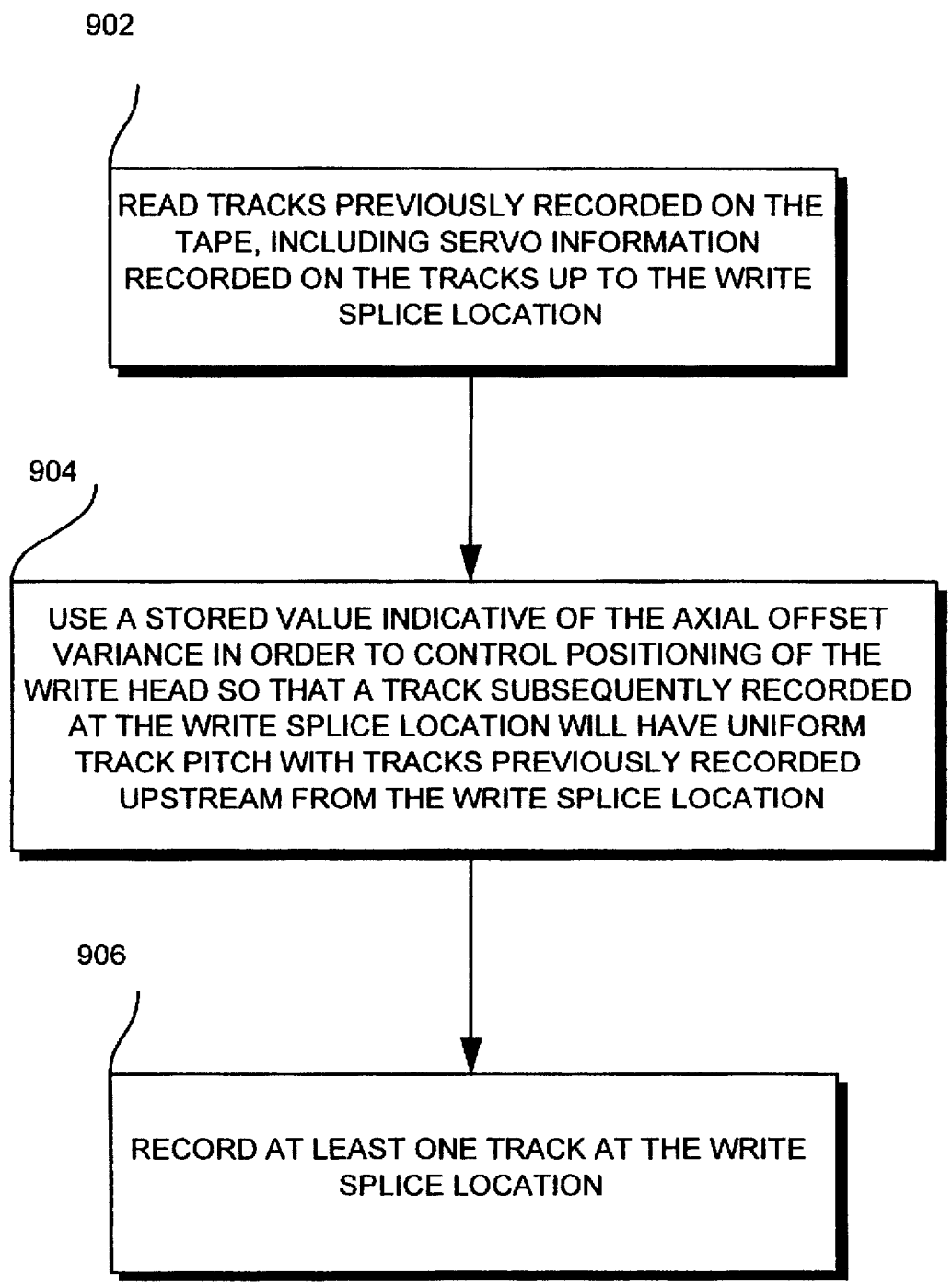
FIG. 9 is a flowchart depicting steps executed according to a method of executing a write splice operation using a helical scan recording system.
Figure 10:
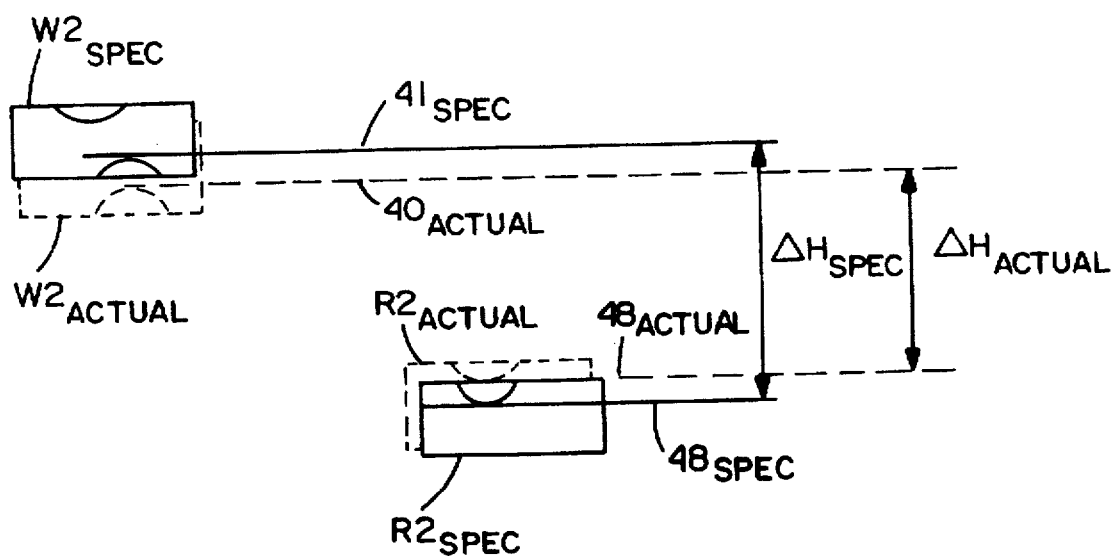
FIG. 10 is a schematic view depicting axial offset variance with reference to an exemplary drum of a helical scan recorder.

FIG. 10 illustrates axial offset variance for an exemplary drum of a helical scan recorder. In other words, FIG. 9 generically represents, for example, drums of helical scan recorders including both the drum 30 of the embodiment of FIG. 1A and drum 30' of the embodiment of FIG. 1B. FIG. 10 contrasts the specification-prescribed positions of heads W2$_{SPEC}$ and R2$_{SPEC}$ with the actual positions W2$_{ACTUAL}$ and R2$_{ACTUAL}$ (heads W2$_{ACTUAL}$ and R2$_{ACTUAL}$ being represented by broken lines). In addition, FIG. 10 contrasts the manufacturing specification axial offset distance $\Delta H_{SPEC}$ and the actual axial offset distance $\Delta H_{ACTUAL}$. As illustrated in FIG. 10.

$$\Delta H_{SPEC} - \Delta H_{ACTUAL} = \text{Axial Offset Variance (AOV)}.$$

While in FIG. 10 the actual placement of heads $W2_{ACTUAL}$ and $R2_{ACTUAL}$ are shown to be closer together than desired by specification, other types of variances may be encountered (e.g., heads $W2_{ACTUAL}$ and $R2_{ACTUAL}$ may be further apart than intended).

Consider, for example, FIG. 10 and FIG. 4A in context of the embodiment of FIG. 1A. In the FIG. 1A embodiment, $\Delta H_{SPEC} = 51.10$ microns. To perform a write splice, a helical scan recorder built perfectly to specification (i.e., AOV=0) would track in a read operation by setting servo amplitudes equal (e.g., 1:1), corresponding to a specification required 4.75 micrometer overlap in each adjacent track (i.e., overlap A=overlap B in FIG. 4A). At the write splice location, the specification-perfect helical scan recorder would switch to a record operation, and create a continuous splice (e.g., the track after the splice would have the same pitch as the track before the splice).

If, in contrast to a specification-perfect recorder, an actual helical scan recorder has an axial offset variance of (for example) 2 microns, at the write splice location the first newly recorded track will have a width (i.e., pitch) that differs from the adjacent tracks by 2 microns.

In the above situation, if the axial offset variance could be reliably measured, then compensation for the axial offset variance is made according to the present invention by purposely positioning back by the axial offset variance. This is done by positioning the tape to create unequal servo amplitudes. For example, if the nominal overlap is supposed to be 4.75 microns and AOV=2 microns, the tape can be positioned to create unequal servo amplitudes in the ratio of $$(4.75+2)/(4.75):(4.75-2)/(4.75)$$

or $$1.4:0.6.$$

Using this criteria, the basic read tracking servo objective becomes:

$$q(A-B)/(A+B)=0 \quad \text{[Equation 1]}$$

where "A" is overlap of read head R1 on a first adjacent track (e.g., track B2 in FIG. 4A); "B" is overlap of read head R1 on a second adjacent track (e.g., track C2 in FIG. 4A); and "q" is servo output voltage per micron of track overlap. The determination of "q" is made by first measuring the output for full overlap.

Considering now the inclusion of the axial offset variance K3 to the read tracking servo criteria, let $$A = A + K3$$

$$B = B - K3$$

which, upon substitution into Equation 1, yields $$q(A-B+2*K3)/(A+B)=0 \quad \text{[Equation 2]}$$

or $$q(A-B)/(A+B) = -2q*K3/(A+B) \quad \text{[Equation 3]}$$

so that the write head can be positioned correctly for a write splice operation by changing the servo criteria by $2q*K3$.

As seen below, this servo criteria offset $2q*K3$ is used to obtain uniform track pitch when write splicing in both the embodiment of FIG. 1A and FIG. 1B. In addition, the value K3 can be computed and used in connection with tape linear velocity determination (and hence used to ensure uniformity of track pitch during even an ordinary write operation in a capstanless system), as explained in simultaneously-filed U.S. patent application Ser. No. 08/150,726 of Georgis and Zweighaft entitled "Method And Apparatus For Controlling Linear Tape Speed In A Helical Scan Tape Recorder" (incorporated herein by reference).

AXIAL OFFSET VARIANCE (AOV) DETERMINATIONS

Axial offset variance (AOV) determinations involve a calibration of the drum (30 or 30') with respect to specification parameters. Three modes of determinations are described with respective reference to FIG. 6, FIG. 7, and FIG. 8. AOV determinations for the modes of FIG. 6 and FIG. 7 have common fundamental steps, illustrated in FIG. 5.

Figure 5:
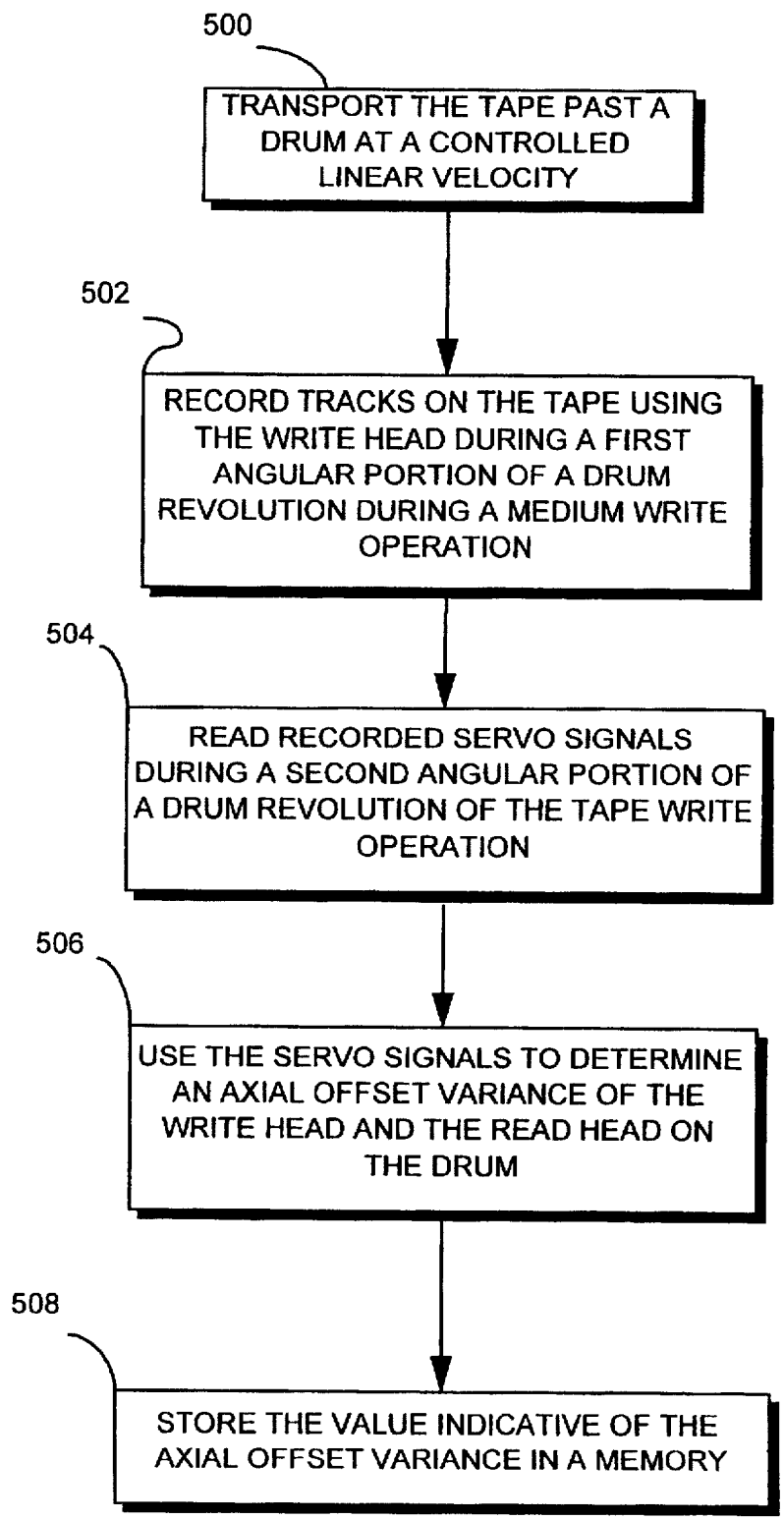
FIG. 5 is a flowchart depicting steps executed according to a method of operating a helical scan recording system.

In step 500 of FIG. 5, the tape is transported past the drum-being-calibrated (the "drum", hereinafter) at a controlled velocity. For the embodiment of FIG. 1B, such transport can occur in the system 30', since system 30' includes capstan 142' whereby the linear velocity of tape 22' can be controlled. For the embodiment of FIG. 1A, as explained subsequently with respect to FIG. 7, drum 30' is removed and installed in another recorder or comparable device in which tape can be transported at a controlled velocity.

At step 502, tracks are recorded on the tape using the write head (W1 or W1') during a first annular portion of a drum revolution during a media write operation. At least selected ones of the tracks are servo-bearing tracks which have servo signals recorded thereon. During a second annular portion of a drum revolution of the tape write operation, servo signals recorded on at least one servo-bearing track are read off-azimuth (see step 504).

At step 506 the servo signals obtained at step 504 are used to determine the axial offset distance separating the write head and the read head on the drum. Then, at step 508 the value indicative of the axial offset variance is stored in a memory.

AOV FIRST MODE DETERMINATION

Figure 6:
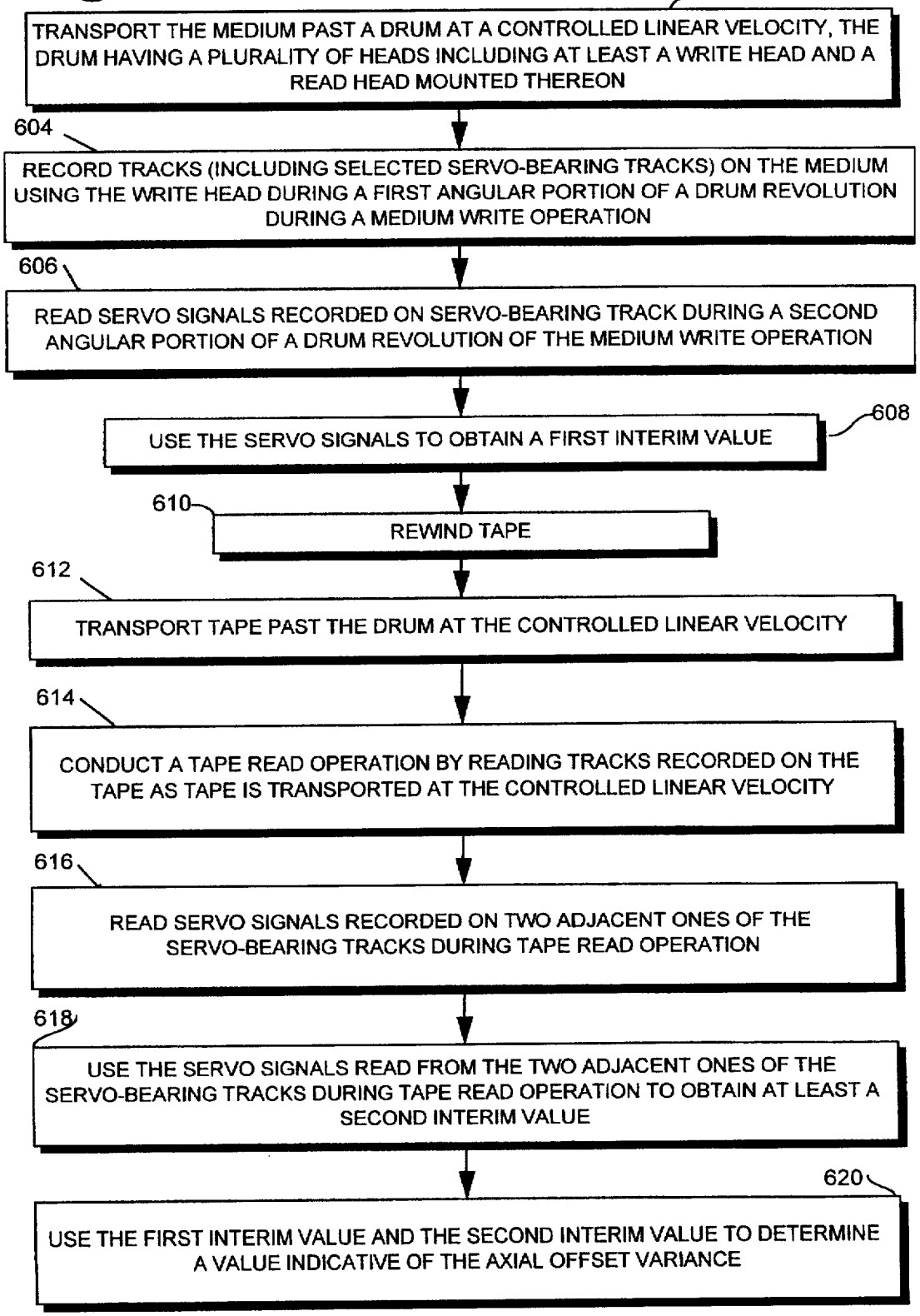
FIG. 6 is a flowchart depicting steps executed according to a method of operating the helical scan recording system of FIG. 1B.

FIG. 6 illustrates steps involved in a first mode AOV determination. The first mode AOV determination is utilized for a helical scan recorder of the type of the embodiment of FIG. 1B (e.g., the type which has a capstan and in which recorded tracks are read back within 180 degrees of recordation) reading a format which includes a guardband.

At step 602 of FIG. 6, tape 22' is transported past drum 30' at a controlled linear velocity. As tape 22' is being so transported, at step 604 tracks (such as servo-bearing track A2 in FIG. 4B) are recorded on the media using write head W2' during a first angular portion of a drum revolution during a media write operation.

Figure 4B:
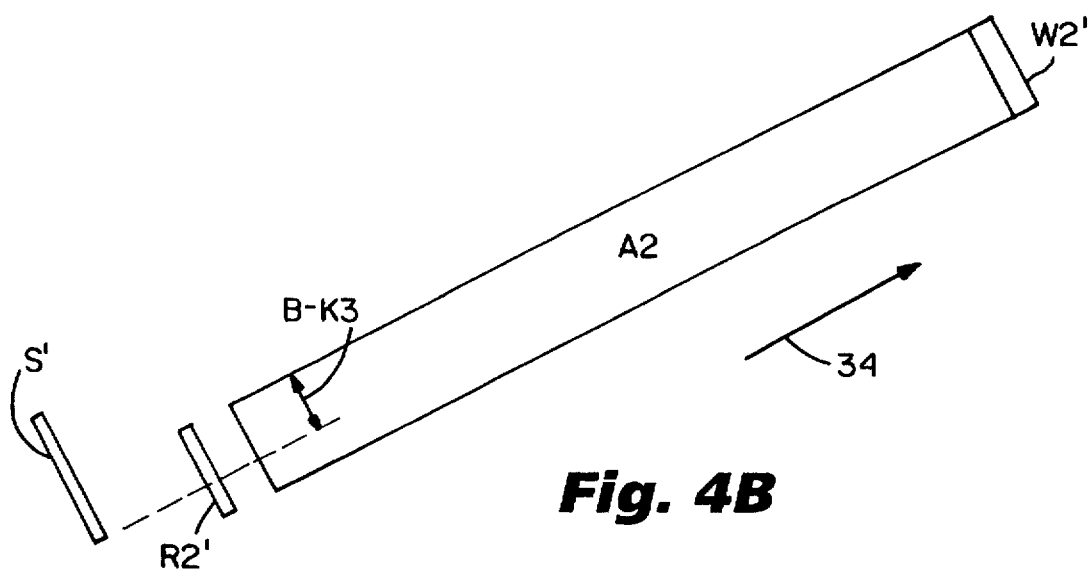
FIGS. 4B and 4C are schematic views of heads in recording and reading operations, respectively, with a guardband format in the helical scan recording system of FIG. 1B.

At step 606, servo signals recorded on only the most recently-recorded servo-bearing track are read by servo head S' during a second angular portion (e.g., in this case 270 degrees following recordation) of a drum revolution of the media write operation, due to the location of servo head S' in the embodiment of FIG. 1B (see FIG. 4B). Then, at step 608, servo motion and control system 152' uses the servo signals obtained during the read-after-write procedure of the write operation to obtain a first interim value q(B−K3).

In the above regard, advantageously tape 22' in recorder 20' travels at a controlled linear velocity since recorder 20' has capstan 142'. However, unlike the embodiment of FIG. 1A, servo head S' is not distanced from head W2' by three track pitches, so head S' reads only the "B" overlap. Thus, at step 608 only the interim value q(B−K3) is obtained.

At step 610 servo and motion control system 152' (acting through reel control subsystem 160') causes the tape to be re-wound. Following rewind, at step 612 tape 22' is transported in the forward direction again at the controlled velocity (see FIG. 4C). During transport, at step 614 recorder 20' conducts a tape read operation with tracking servo activated. In connection with the tape read operation of step 614, at step 616 servo head S' reads servo signals on two adjacent ones of the guardband-separated servo-bearing tracks.

Figure 4C:
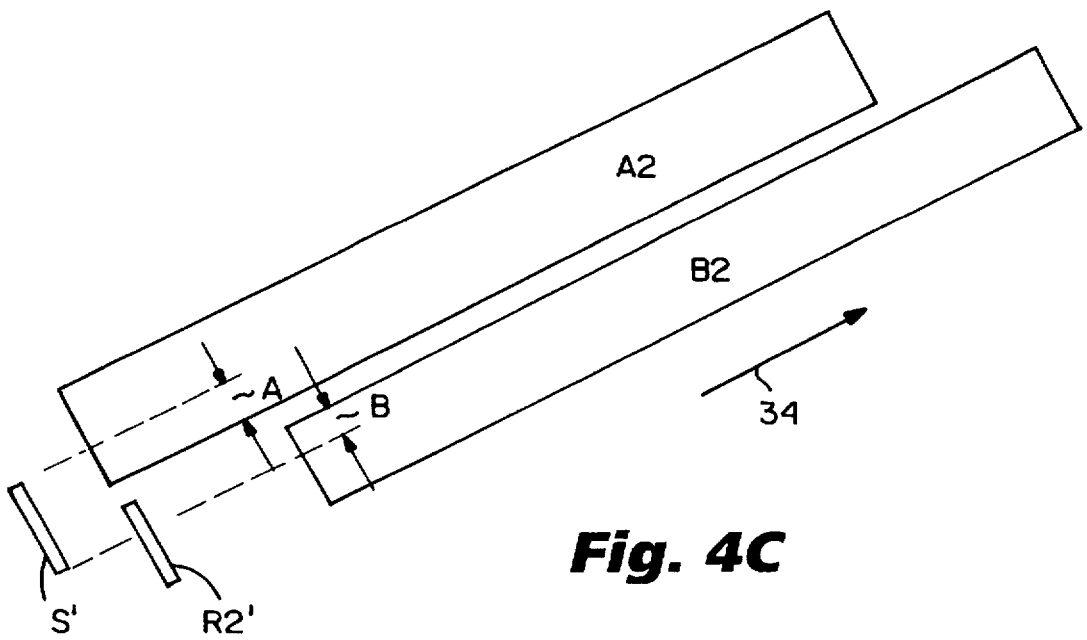

Having obtained servo amplitudes of two-servo bearing tracks at step 616 (i.e., "qA" and "QB") at step 618 servo and motion control system 152' of recorder 20' uses the two servo amplitudes to obtain two further interim values. That is, at step 618 the overlap values A and B are determined as shown in FIG. 4C. Knowing the overlap values A and B from the step 618 determination, as well as the value q(B−K3) from step 608, at step 620 the axial offset variance K3 can be calculated by servo and motion control system 152'. Axial offset variance K3 can then be stored in memory for subsequent use during write splice operations.

AOV SECOND MODE DETERMINATION

Figure 7:
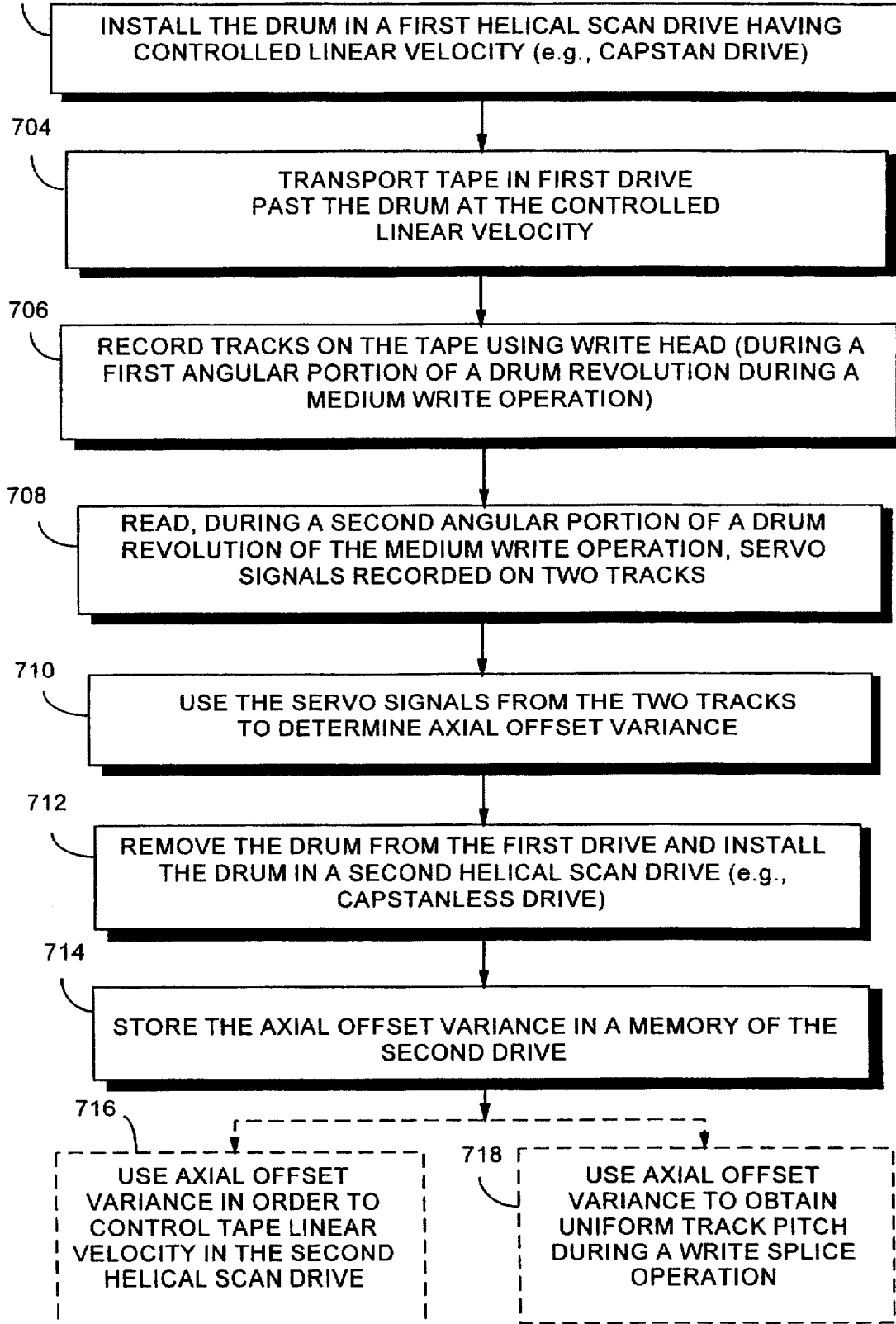
FIG. 7 is a flowchart depicting steps executed according to a method of calibrating a head of a helical scan recording system of FIG. 1A.

FIG. 7 illustrates steps involved in a second mode AOV determination. The second mode AOV determination is utilized for a helical scan recorder of the type of the embodiment of FIG. 1A (e.g., a capstanless type in which recorded tracks are read back after more than 180 degrees of recordation).

At step 702 of FIG. 7, drum 30 of recorder 20 is installed in a calibration device (e.g., another helical scan recorder) having controlled linear velocity (e.g., capstan drive recorder). For the sake of the present discussion, it is assumed that drum 30 of recorder 20 is substituted for drum 30' in recorder 20' of FIG. 1B, although it should be understood that other calibration devices can instead be employed.

Following the installation of drum 30, at step 704, tape in the calibration device (e.g., tape 22' in recorder 20') is transported past drum 30 at the controlled linear velocity. During the velocity-controlled transport, at step 706 tracks are recorded by heads W1, W2 on tape 22'. Track recordation occurs during a first annular portion of a drum revolution during a media write operation.

At step 708, during a second angular portion of a drum revolution of the media write operation (e.g., 540 degrees after recordation), servo signals recorded on two tracks (e.g., tracks C2 and B2 in FIG. 4A) are read, thereby obtaining the "A" and "B" overlaps (see FIG. 4A). At step 710, control microprocessor 66' uses the "A" and "B" values, as well as the "q" value discussed above, to determine axial offset distance in accordance with Equation 3.

At step 712 drum 30' is removed from the calibration device (e.g., recorder 20') and installed in capstanless recorder 20. Accompanying installation of drum 30 in recorder 20, at step 714 the axial offset variance K3 obtained from step 710 is loaded into memory 122 of recorder 20 (see FIG. 3A) for subsequent use by servo signal processing circuitry 62. Axial offset variance K3 has various uses, including (as indicated by step 716) being a factor in a determination of tape linear velocity in a manner understood with reference to simultaneously-filed U.S. patent application Ser. No. 08/150,726 of Georgis and Zweighaft entitled "Method And Apparatus For Controlling Media Linear Speed In A Helical Scan Recorder" (incorporated herein by reference). Also, as indicated by step 718, axial offset variance K3 is used to obtain uniform track pitch during a write splice operation (understood with reference to the ensuing discussion of FIG. 9.

AOV THIRD MODE DETERMINATION

Figure 8:
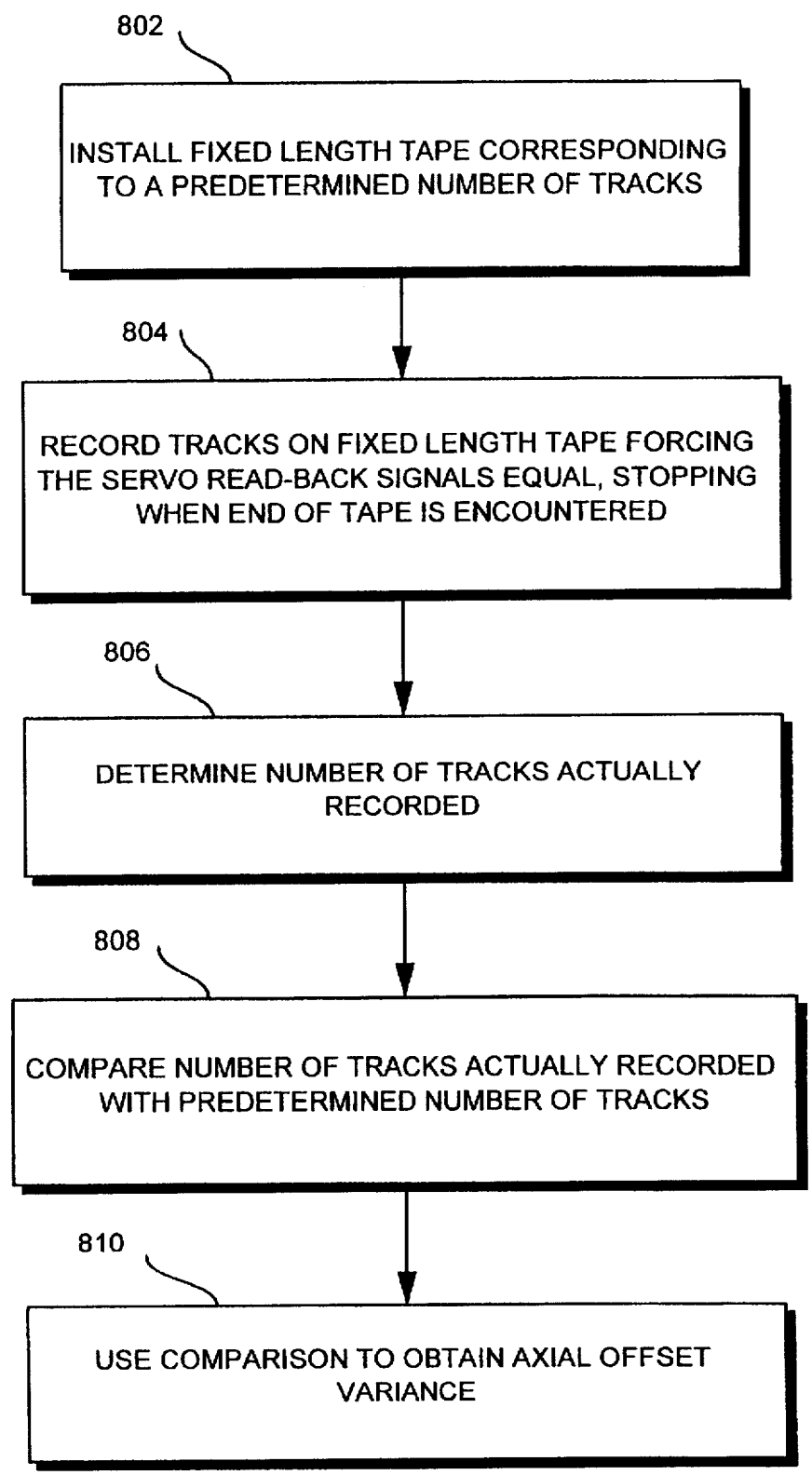
FIG. 8 is a flowchart depicting steps executed according to another method of calibrating a head of a helical scan recording system of FIG. 1A.

FIG. 8 illustrates steps involved in a third mode AOV determination. The third mode AOV determination is illustrated for a helical scan recorder of the type of the embodiment of FIG. 1A (e.g., a capstanless type in which recorded tracks are read back after more than 180 degrees of recordation).

At 802 a fixed length tape is installed in system 30. The fixed length tape is of a length sufficient to have recorded thereon a predetermined number of tracks followed by an end of tape marker. For example, the fixed length tape may be of a length corresponding to 1000 tracks.

At step 804, information such as predetermined calibration information is loaded into write preparatory circuitry 62 of recorder 20 and recorded on the fixed length tape until end of tape is encountered. The servo signals are read back during the write process as described in AOV Second Mode Determination, supra. The linear tape speed is modified to set the readback signals equal as described in simultaneously-filed U.S. patent application Ser. No. 08/150,726 of Georgis and Zweighaft entitled "Method And Apparatus For Controlling Linear Tape Speed In A Helical Scan Recorder" (incorporated herein by reference).

At step 806 control microprocessor 66 (or, alternatively, servo signal processing circuitry 62) determines the number of tracks actually recorded in attempting to record the predetermined calibration information on the fixed length tape.

At step 808 control microprocessor 66 (or, alternatively, servo signal processing circuitry 62) compares the number of tracks actually recorded with the predetermined number of tracks which perfectly fit on the fixed length tape (e.g., 1000 in the present example). If, for example, at step 806 it were determined that only 980 tracks were recorded, it can then be surmised that the linear tape velocity of the fixed length tape was run 2% too fast in recorder 30. Alternatively, if 1020 tracks were recorded, the fixed length tape was run 2% too slow in recorder 30.

At step 810 control microprocessor 66 (or, alternatively, servo signal processing circuitry 62) uses the comparison of step 808 to obtain axial offset variance. In this regard, in one mode of executing step 810, a look-up table stored in a memory (such as memory 122) is consulted. The look-up table can have stored therein information such as that illustrated in Table 1 (Table 1 being applicable to an embodiment having nominal 15.5 micron track pitch). From Table 1 it can be concluded that the tracking error for a 2% too fast speed error is −16.87%, which defines 2q*K3/(A+B). From this value, axial offset variance K3 is determined.

WRITE SPLICE OPERATION

FIG. 9 shows basic steps applicable to a write splice operation for either the helical scan recorder system 20 of FIG. 1A or the helical scan recorder system 20' of FIG. 1B. At step 902, tracks previously recorded on the tape (22 or 22') are read up to the write splice location. In connection with previous track reading at step 902, however, as indicated by step 904 the servoing scheme is altered in anticipation of a write splice. In particular, the servo controller (62 or 152') uses the stored value indicative of the axial offset variance in order to control positioning of the heads so that, including the write heads, so that a track subsequently recorded at the write splice location will have uniform track pitch with tracks previously recorded upstream from the write splice location. In this regard, the servoing criteria is modified by setting the criteria back by the amount 2q*K3. Step 906 reflects recordation of at least one new track at the write splice location (it being understood that most likely many new tracks will be recorded).

While the invention has been particularly shown and described with reference to the preferred embodiments thereof, it will be understood by those skilled in the art that various alterations in form and detail may be made therein without departing from the spirit and scope of the invention. Moreover, although the particular media illustrated herein is magnetic tape, the invention is not limited thereto but can be used with other media employed in a helical scan environment.

TABLE 1

| Actual Tape Speed | Written Track Width | R1 Center line Error | R1 head overlap − | R1 head overlap + | Speed Error | Tracking Error |
|---|---|---|---|---|---|---|
| 31.56 | 14.73 | 1.94 | 7.08 | 3.20 | −5.00% | 37.71% |
| 31.73 | 14.80 | 1.74 | 6.84 | 3.36 | −4.50% | 34.20% |
| 31.90 | 14.88 | 1.55 | 6.61 | 3.51 | −4.00% | 30.63% |
| 32.06 | 14.96 | 1.36 | 6.38 | 3.67 | −3.50% | 27.01% |
| 32.23 | 15.04 | 1.16 | 6.15 | 3.82 | −3.00% | 23.33% |
| 32.40 | 15.11 | 0.97 | 5.91 | 3.98 | −2.50% | 19.60% |
| 32.56 | 15.19 | 0.77 | 5.68 | 4.13 | −2.00% | 15.80% |
| 32.73 | 15.27 | 0.58 | 5.45 | 4.29 | −1.50% | 11.94% |
| 32.89 | 15.35 | 0.39 | 5.22 | 4.44 | −1.00% | 8.03% |
| 33.06 | 15.42 | 0.19 | 4.98 | 4.59 | −0.50% | 4.05% |
| 33.23 | 15.50 | 0.00 | 4.75 | 4.75 | 0.00% | 0.00% |
| 33.39 | 15.58 | −0.19 | 4.52 | 4.91 | 0.50% | −4.11% |
| 33.56 | 15.66 | −0.39 | 4.29 | 5.06 | 1.00% | −8.29% |
| 33.72 | 15.73 | −0.58 | 4.05 | 5.21 | 1.50% | −12.54% |
| 33.89 | 15.81 | −0.77 | 3.82 | 5.37 | 2.00% | −16.87% |
| 34.06 | 15.89 | −0.97 | 3.59 | 5.52 | 2.50% | −21.26% |
| 34.22 | 15.97 | −1.16 | 3.35 | 5.68 | 3.00% | −25.73% |
| 34.39 | 16.04 | −1.36 | 3.12 | 5.84 | 3.50% | −30.28% |
| 34.55 | 16.12 | −1.55 | 2.89 | 5.99 | 4.00% | −34.91% |
| 34.72 | 16.20 | −1.74 | 2.66 | 6.15 | 4.50% | −39.62% |
| 34.89 | 16.28 | −1.94 | 2.42 | 6.30 | 5.00% | −44.41% |

The embodiments of the invention in which an exclusive property or privilege is claimed are defined as follows:

What is claimed is:

1. A method of calibrating a drum which records and reads information in a helical stripped format upon a storage medium, the drum having a write head and a read head mounted thereon, the method comprising:

installing the drum in a first helical scan recorder in which a medium is transported past the drum at a controlled linear velocity;

transporting the medium past the drum at the controlled linear velocity;

recording tracks on the medium using the write head of the drum during a first angular portion of the drum revolution during a medium write operation of the first helical scan recorder, each track having a servo signal recorded thereon;

reading, during a second angular portion of the drum revolution of the medium write operation of the first helical scan recorder, servo signals recorded on two tracks;

using the servo signals from the two tracks to determine a value indicative of an axial offset variance of the write head and the read head on the drum;

removing the drum from the first helical scan recorder and installing the drum in a second helical scan recorder;

storing the value indicative of the axial offset variance in a memory of the second helical scan recorder.

2. The method of claim 1, further comprising using the axial offset variance in order to control linear velocity of the storage medium in the second helical scan recorder.

3. The method of claim 1, further comprising using the value indicative of the axial offset variance in order to attain uniform track pitch during a write splice operation.

4. The method of claim 1, wherein a value K3 of axial offset variance is determined by evaluating the expression:

$$q(A-B)=-2q*K3$$

wherein

A is a value indicative of a first overlap of the read head on a first of the two tracks;

B is a value indicative of a second overlap of the read head on a second of the two tracks;

q is servo output voltage per unit of track overlap.

5. The method of claim 1, wherein the axial offset variance is a differential between (1) a desired axial offset distance by which a write head is supposed to be separated from a read head on the drum along a drum axis, and (2) an actual axial offset distance by which a write head is actually separated from a read head on the drum along the drum axis.

6. A method of calibrating a drum of which records information in a helical stripped format upon a storage medium, the drum having a write head and a read head mounted thereon, the method comprising:

installing the drum in a first helical scan recorder in which a medium is transported past the drum at a controlled linear velocity;

transporting the medium past a drum at the controlled linear velocity;

recording tracks on the medium using the write head during a first angular portion of a drum revolution during a medium write operation of the first helical scan recorder, each track having a servo signal recorded thereon;

reading, during a second angular portion of the drum revolution of the medium write operation of the first helical scan recorder, servo signals recorded on two tracks to obtain a first overlap signal indicative of an overlap of a read head on a first of the two tracks and a second overlap signal indicative of an overlap of the read head on a second of the two tracks;

using the first overlap signal and the second overlap signal to determine a value indicative of an axial offset variance of the write head and the read head on the drum;

removing the drum from the first helical scan recorder and installing the drum in a second helical scan recorder;

storing the value indicative of the axial offset variance in a memory of the second helical scan recorder.

7. The method of claim 6, wherein a value K3 of axial offset variance is determined by evaluating the expression:

$$q(A-B) = -2q * K3$$

wherein

A is a value indicative of a first overlap of the read head on a first of the two tracks;

B is a value indicative of a second overlap of the read head on a second of the two tracks;

q is servo output voltage per unit of track overlap.

8. The method of claim 6, wherein the axial offset variance is a differential between (1) a desired axial offset distance by which a write head is supposed to be separated from a read head on the drum along a drum axis, and (2) an actual axial offset distance by which a write head is actually separated from a read head on the drum along the drum axis.

* * * * *

UNITED STATES PATENT AND TRADEMARK OFFICE
CERTIFICATE OF CORRECTION

PATENT NO. : 5,731,921
DATED : March 24, 1998
INVENTOR(S) : Timothy C. Hughes and Fadi Y. Abou-Jaoude It is certified that error appears in the above-identified patent and that said Letters Patent is hereby corrected as shown below:

On the title page, item [54] and column 1, line 3, change "HELLICAL" to --HELICAL--.

In the ABSTRACT line 5, change "track;" to --tracks--;
line 12, delete "second recorder,".

Column 12, line 36, delete "of".

Signed and Sealed this

Nineteenth Day of January, 1999

Attest:

Attesting Officer

*Acting Commissioner of Patents and Trademarks*